July 16, 1968  R. I. KAUFMAN  3,393,015
HUB CAP
Filed Oct. 28, 1966
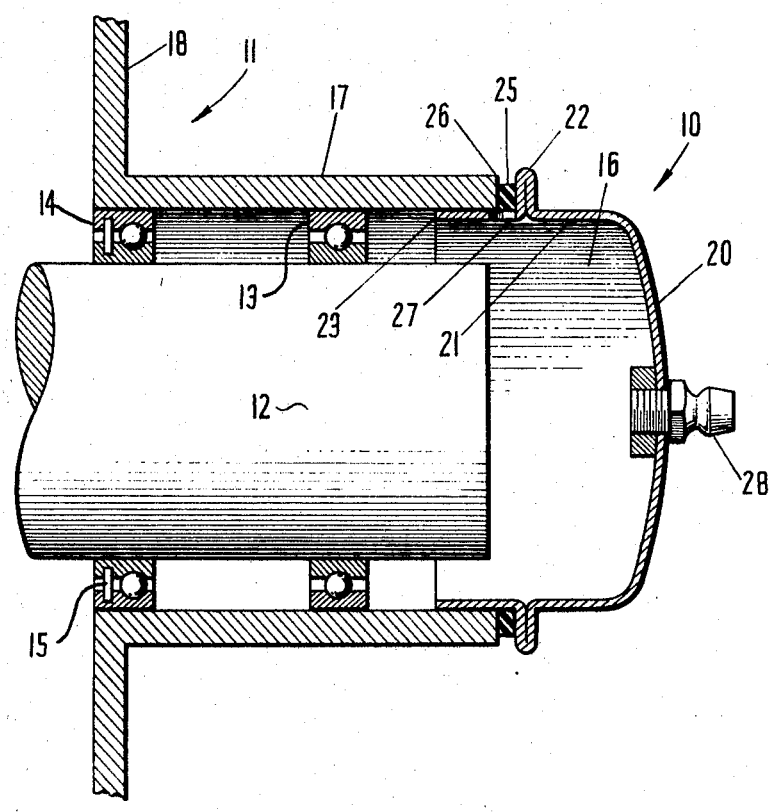
INVENTOR
Robert I. Kaufman
BY
Wolf, Greenfield & Hieken
HIS ATTORNEY(S)

United States Patent Office 3,393,015
Patented July 16, 1968

3,393,015
HUB CAP
Robert I. Kaufman, 360 Eastern Ave.,
Malden, Mass. 02148
Filed Oct. 28, 1966, Ser. No. 590,305
5 Claims. (Cl. 301—108)

ABSTRACT OF THE DISCLOSURE

A boat trailer hub cap for a wheel axle with a cylindrical wall. The cap has a cover and annular side wall frictionally fitting within the cylindrical wall.

An O-ring encircles the annular side wall over a valve opening and is located by an outwardly extending annular flange. The O-ring is forced away from the opening by internal pressures.

---

The present invention relates to a hub cap construction and, in particular, to a hub cap that is adapted to be used on a hub that is periodically submerged in water, such, for example, as those used on boat trailers.

Bearings and axles used on boat trailers or other similar applications are subjected to considerable abuse and, because of their frequent immersion in water, it is necessary to make every effort to properly seal the axle bearings so as to prevent water and other contaminants from damaging the axle and its bearings. Boat-trailer axles are subjected to considerable abuse and abnormal conditions. Frequently, boat trailers are driven for miles at high speeds to the water and immediately or shortly after arrival are backed into the water so as to permit the boat on the trailer to be floated into the water. During the high speed travel, the air within the hub is heated and a portion of its escapes through the rotating seals of the hub construction. When the trailer is backed into the water, the hub is cooled thereby creating a partial vacuum which is filled with water, grit and other contaminants that are sucked through the seal construction. This can be particularly damaging especially when the boat is backed into salt water.

Attempts have been made to overcome these problems. (See, for example, Patent No. 3,077,948.) These attempts are not altogether satisfactory for several reasons. First, these constructions are expensive and complicated. They require a number of movable parts and, therefore, have facing surfaces between which water is apt to seep. In addition, these relatively complicated devices are apt to fail and are difficult to repair.

It is an object of the present invention to overcome these difficulties. In the present invention there is provided means designed to normally preclude the ingress of water and other contaminants when an axle is immersed in water. It is also an object of the present invention to provide a hub cap construction which is easy to install on a hub, is not likely to be damaged or require repair, and which can be efficiently greased without the likelihood of losing the grease or of admitting foreign contaminants, such as water, dust or dirt.

These and other objects and advantages of the present invention will be more clearly understood when considered in conjunction with the accompanying drawings in which the drawing is a sectional view of a hub cap assembly made in accordance with the present invention. The cylindrical hub cap 10 is mounted on a wheel hub 11. The wheel hub 11 is free to rotate about a conventional spindle 12 by means of bearings 13 and 14. Rotating seal 15 seals the chamber within the hub 11 and hub cap 10, while allowing rotation between the spindle 12 on the one hand and the hub 11 and hub cap 10 on the other hand. The wheel hub 11 is provided with a cylindrical wall 17 parallel to the spindle 12, and an outwardly extending flange 18 that is in turn adapted to be secured to the wheel construction by suitable means such as bolts (not shown).

The hub cap 10 comprises a cover 20 with an integrally formed and depending annular side wall 21. An annular flange 22 extends outwardly from and is integral with the annular side wall 21. The flange 22 is positioned in a plane spaced from the free end or edge 23 of the annular side wall 21, and lies in a plane normal to the axis of the annular side wall 21. The annular flange 22, the annular side wall 21 and the cover 20 may be formed of a single piece of stamped metal. The outer diameter of the annular side wall 21 is substantially equal to the inner diameter of the cylindrical wall 17. The outer surface of the annular side wall 21 is adapted to and engages the inner surface of wall 17 in a watertight, friction-pressed fit. The flange 22 extends parallel and spaced to the end or edge of wall 17. An O-ring 25 of conventional O-ring material, such as rubber, is positioned between the end 26 of wall 17 and flange 22. This O-ring is preferably rectangular in cross section and is preferably compressed laterally at least 5 percent of its thickness.

A hole 27 extends through the wall 21 immediately adjacent flange 22 on the side of the wall closer to the edge 23. This opening 27 is positioned to underlie the O-ring 25 when the hub cap 10 is secured on the hub 11.

A grease fitting 28 of conventional design is secured in an opening in the cover 20 for admission of grease to the interior 16 of the hub cap.

In this construction, the hub cap 10 is rigidly secured to the hub 11 in a watertight seal by frictional interengagement of the walls 17 and 21. The O-ring 25 is compressed between the end of wall 17 and flange 22 so as to close the hole 27. The interior 16 of the hub cap is suitably filled with grease which may be periodically introduced through the valve 28. Any pressure buildup within the hub cap 10 caused during high-speed operation of the unit can escape through the hole 27 without the likelihood of blowing the hub cap off the hub. Air and excess grease injected into the space 16 forces its way through the hole 27 and pushes that portion of the O-ring 25 overlying the hole 27 outwardly so as to permit its escape. After the air or excess grease has escaped, the O-ring will normally return to the position shown in the drawing thereby closing the hole 27. Thus this construction acts as a one-way valve permitting escape of excess air and greases. When the hub and hub cap assembly are suddenly introduced to cool water, such as the case with a boat trailer, the vacuum created in the space 16 by the sudden cooling will suck the O-ring 25 inwardly and over the opening 27, thus effectively sealing the opening against ingress of water or other foreign contaminants.

What is claimed is:

1. A boat trailer hub cap construction for a hub cap adapted to fit about a wheel axle and having a cylindrical wall adapted to receive said hub cap, comprising, said hub cap having a cover with an integrally formed and depending annular side wall, said side wall having an outer diameter less than the inner diameter of said cylindrical wall and adapted to engage said cylindrical wall in a friction fit, an annular flange extending outwardly from said annular side wall at a position spaced from the free edge of said annular side wall and lying in a plane normal to the axis of said annular side wall, an opening through said annular side wall between said annular flange and said free edge, and an O-ring of rubber-like consistency encircling said annular side wall between said annular flange and said free edge overlying said aperture.

2. A device as set forth in claim 1 wherein said O-ring has a rectangular cross section.

3. A device as set forth in claim 1 wherein said hub cap is secured to said hub with said sidewall and cylindrical wall in a frictional fit, said O-ring being compressed between said annular flange and said free edge and adapted to be forced outwardly by pressure through said aperture.

4. A device as set forth in claim 3 wherein said O-ring has a rectangular cross section.

5. A device as set forth in claim 4 having a grease fitting secured to said cover of said hub cap for admission of grease.

References Cited

UNITED STATES PATENTS

| | | | |
|---|---|---|---|
| 1,766,313 | 6/1930 | Stokes | 301—108 |
| 1,776,641 | 9/1930 | Smith | 301—108 |
| 2,606,779 | 8/1952 | Jagger | 277—29 |
| 3,077,948 | 2/1963 | Law | 301—108 X |
| 3,089,738 | 5/1963 | Steiner | 308—187 |
| 3,331,638 | 7/1967 | Fruth | 301—108 |

RICHARD J. JOHNSON, *Primary Examiner.*